(12) United States Patent  (10) Patent No.: US 11,759,889 B2
Tanaka  (45) Date of Patent: Sep. 19, 2023

(54) WORKPIECE HAVING WELD, WELDING APPARATUS FOR WORKPIECE, AND WELDING METHOD

(71) Applicant: NHK SPRING CO., LTD., Yokohama (JP)

(72) Inventor: Naoki Tanaka, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 169 days.

(21) Appl. No.: 17/505,698

(22) Filed: Oct. 20, 2021

(65) Prior Publication Data

US 2022/0040792 A1  Feb. 10, 2022

Related U.S. Application Data

(62) Division of application No. 16/043,070, filed on Jul. 23, 2018, now Pat. No. 11,219,970.

(30) Foreign Application Priority Data

Jul. 28, 2017  (JP) .................................. 2017-146785

(51) Int. Cl.
*B23K 26/22* (2006.01)
*B23K 26/06* (2014.01)
(Continued)

(52) U.S. Cl.
CPC .......... *B23K 26/22* (2013.01); *B23K 26/0626* (2013.01); *B23K 26/0876* (2013.01);
(Continued)

(58) Field of Classification Search
CPC ...... B23K 26/244; B23K 26/22; B23K 26/32; B23K 26/323; B23K 26/082;
(Continued)

(56) References Cited

U.S. PATENT DOCUMENTS 5,201,458 A  4/1993 Hagen
5,299,965 A  4/1994 Lee
(Continued)

FOREIGN PATENT DOCUMENTS

CN  1499489 A  5/2004
CN  102642088 A  8/2012
(Continued)

OTHER PUBLICATIONS

Chinese Office Action (and English translation thereof) dated Jul. 27, 2020, issued in counterpart Chinese Application Mo. 201810750508.1.
(Continued)

*Primary Examiner* — Chris Q Liu
(74) *Attorney, Agent, or Firm* — Holtz, Holtz & Volek PC

(57) ABSTRACT

A method of welding a first metal plate and a second metal plate that is thicker than the first plate, by a laser beam. The first plate and the second plate are disposed to overlap one another in a thickness direction. In a first laser irradiation step, the laser beam is emitted at the first plate, to form an initial nugget including a front-side nugget portion in the first plate, a back-side nugget portion in the second plate and having a diameter smaller than a diameter of the front-side nugget portion, and an annular flat surface portion existing between the front-side nugget portion and the back-side nugget portion. In a subsequent laser irradiation step, the laser beam is emitted again at the initial nugget after the initial nugget is solidified, thereby increasing the diameter of the back-side nugget portion.

4 Claims, 5 Drawing Sheets

(51) Int. Cl.
*B23K 37/04* (2006.01)
*B23K 101/36* (2006.01)
*B23K 26/244* (2014.01)
*B23K 26/08* (2014.01)

(52) U.S. Cl.
CPC ........ *B23K 26/244* (2015.10); *B23K 37/0408* (2013.01); *B23K 2101/36* (2018.08)

(58) Field of Classification Search
CPC ............... B23K 26/0006; B23K 26/0665; B23K 26/21; B23K 26/324; B23K 26/60; B23K 26/06; B23K 26/0608; B23K 26/0626; B23K 26/064; B23K 26/067; B23K 26/0876; B23K 26/0884; B23K 26/123; B23K 26/127; B23K 26/142; B23K 26/1436; B23K 26/1476; B23K 26/18; B23K 26/20; B23K 26/28; B23K 26/322; B23K 26/348
USPC ............ 219/121.64, 121.63, 121.85, 121.14, 219/121.46, 121.59, 121.6, 121.65, 219/121.66, 121.73, 121.76, 121.84; 360/245.2, 234.6, 235.4, 244.2, 244.9, 360/245.4

See application file for complete search history.

(56) References Cited

U.S. PATENT DOCUMENTS

| | | |
|---|---|---|
| 6,576,864 B2 | 6/2003 | Dijken et al. |
| 7,486,481 B2 | 2/2009 | Kashima |
| 7,782,570 B1 | 8/2010 | Theis et al. |
| 8,070,907 B2 | 12/2011 | Tanaka |
| 9,064,516 B2 | 6/2015 | Arai et al. |
| 10,155,285 B2 | 12/2018 | Fujiwara et al. |
| 2004/0089638 A1 | 5/2004 | Tanaka |
| 2008/0062567 A1 | 3/2008 | Toukairin et al. |
| 2012/0211474 A1 | 8/2012 | Hayashimoto et al. |
| 2012/0248076 A1* | 10/2012 | Hosokawa ............ B23K 26/22 219/121.64 |
| 2014/0377578 A1* | 12/2014 | Hisada ............... B23K 26/22 219/121.64 |
| 2015/0138675 A1 | 5/2015 | Arai et al. |
| 2015/0145241 A1 | 5/2015 | Asami et al. |
| 2015/0174702 A1* | 6/2015 | Fujimoto ............... B23K 26/60 219/121.64 |
| 2015/0298255 A1* | 10/2015 | Hisada ................. B23K 26/32 219/121.64 |
| 2015/0336212 A1* | 11/2015 | Hisada ................. B23K 26/082 219/121.64 |
| 2016/0114429 A1 | 4/2016 | Shioga et al. |
| 2016/0267929 A1 | 9/2016 | Someya et al. |
| 2016/0288261 A1* | 10/2016 | Hisada ................. B23K 15/008 |
| 2016/0351215 A1 | 12/2016 | Tanaka |
| 2018/0099357 A1* | 4/2018 | Hisada ................. B23K 26/32 |
| 2019/0030645 A1* | 1/2019 | Tanaka .............. B23K 26/0626 |

FOREIGN PATENT DOCUMENTS

| | | |
|---|---|---|
| CN | 106077954 A | 11/2016 |
| EP | 3093096 A1 | 11/2016 |
| JP | S59179279 A | 10/1984 |
| JP | S6018287 A | 1/1985 |
| JP | S6233086 A | 2/1987 |
| JP | S6454984 U | 4/1989 |
| JP | H05277771 A | 10/1993 |
| JP | 2004154836 A | 6/2004 |
| JP | 2006059464 A | 3/2006 |
| JP | 2007305620 A | 11/2007 |
| JP | 2010023047 A | 2/2010 |
| JP | 2010023048 A | 2/2010 |
| JP | 2014147962 A | 8/2014 |
| JP | 2015097133 A | 5/2015 |
| JP | 2015147234 A | 8/2015 |
| JP | 2016225001 A | 12/2016 |

OTHER PUBLICATIONS

Japanese Office Action (and English language translation thereof) dated Mar. 16, 2021 issued in Japanese Application No. 2017-146785.

Notice of Allowance dated Sep. 23, 2021 issued in U.S. Appl. No. 16/043,070.

Office Action (Final Rejection) dated Apr. 22, 2021 issued in U.S. Appl. No. 16/043,070.

Office Action (Non-Final Rejection) dated Nov. 19, 2020 issued in U.S. Appl. No. 16/043,070.

* cited by examiner

WORKPIECE HAVING WELD, WELDING APPARATUS FOR WORKPIECE, AND WELDING METHOD

CROSS-REFERENCE TO RELATED APPLICATIONS

This application is a Divisional Application of U.S. application Ser. No. 16/043,070, filed Jul. 23, 2018, which is based upon and claims the benefit of priority from prior Japanese Patent Application No. 2017-146785, filed Jul. 28, 2017, the entire contents of all of which are incorporated herein by reference.

BACKGROUND OF THE INVENTION

1. Field of the Invention

The present invention relates to a workpiece having a weld subjected to laser welding such as a disk drive suspension, a welding apparatus for a workpiece, and a welding method.

2. Description of the Related Art

A hard disk drive (HDD) is used in an information processing apparatus such as a personal computer. The hard disk drive comprises a magnetic disk rotatable about a spindle, a carriage turnable about a pivot, etc. A disk drive suspension is provided on an arm of the carriage. The disk drive suspension comprises a load beam formed of a thin stainless steel plate, and a flexure disposed along the load beam.

Various types of flexures have been put to practical use according to the required specifications. For example, a flexure with a circuit member includes a flexure body formed of a stainless steel plate, an insulating layer, a plurality of conductors, and insulating resin covering the conductors. A thickness of the flexure body is less than a thickness of the load beam. The insulating layer is formed of insulating resin such as polyimide, and is formed on a surface of the flexure body. The conductors are made of copper, and are formed on a surface of the insulating layer.

In order to fix two metal plates to each other, spot welding may be applied. For example, JP 2010-23047 A (Patent Literature 1) and JP 2007-305620 A (Patent Literature 2) describe spot welding using laser beams (which will be hereinafter referred to as laser welding). By the laser welding, a part of the workpiece is melted and solidified by irradiation of a laser beam at a weld of the workpiece to form a nugget.

If the plate to be welded has a sufficient thickness, the diameter of the nugget can be increased by irradiating the workpiece with a laser beam at high power. If the diameter of the nugget is large, the weld strength can be increased accordingly. However, when a thin plate, such as foil having a thickness of several tens of μm, is used, if a high-power laser beam is emitted, a hole may be formed in the weld. When thin metal plates such as foil pieces are to be laser-welded to each other, a laser beam is emitted for a short time at low power. In that case, a laser oscillator emits a laser beam within a range of power and time close to the minimum power and a minimum amount of time allowing the laser beam to be emitted stably. Accordingly, controlling the laser oscillator is difficult.

The aforementioned Patent Literatures 1 and 2 describe welding the two metal plates together by a laser beam. In this case, the greater the energy of the laser to be irradiated on the weld is, the greater the nugget is that is formed in the weld. In the case of a plate where the size of a nugget is not particularly limited, a high-energy laser beam can be emitted at the weld. A flexure of the disk drive suspension is an extremely small component in which a thin metal plate (foil) is provided with a circuit portion of a high degree of integration. In the case of a small component such as a flexure, if the diameter of the nugget is large, insulating resin which constitutes a part of the circuit portion may be affected by heat of the nugget. For example, the insulating resin (for example, polyimide) may be burned or deteriorated by the heat of the nugget. This can be a cause of deteriorating the quality of the circuit portion. The diameter of the nugget may not be able to be increased because of spatial restriction, or a range in which the heat of the nugget reaches may be desired to be reduced as much as possible. In such a case, a converged (focused) laser beam is used. However, in welding which uses the converged laser beam, not only the diameter of a front-side nugget portion is small, but also the diameter of a back-side nugget portion which affects the weld strength is further reduced.

BRIEF SUMMARY OF THE INVENTION

An object of the present invention is to provide a weld in which the diameter of the back-side nugget portion that affects the weld strength can be approximated to the diameter of the front-side nugget portion without excessively increasing the diameter of the front-side nugget portion, in welding a workpiece formed of thin plates such as a flexure and a load beam, and a welding apparatus and a welding method used for forming such a weld.

One embodiment relates to a workpiece comprising a first plate and a second plate made of metal, the first plate and the second plate overlapping one another in a thickness direction, and being fixed together by a weld, in which the weld comprises a front-side nugget portion formed in the first plate, a back-side nugget portion formed in the second plate, and an annular flat surface portion. The back-side nugget portion is integral with the front-side nugget portion, and a diameter of the back-side nugget portion is smaller than a diameter of the front-side nugget portion. The back-side nugget portion is shaped such that the diameter is gradually reduced from a boundary portion between the first plate and the second plate toward a rear face of the second plate. Moreover, in a peripheral surface of the back-side nugget portion, in a thicknesswise cross section of the second plate, a tilt angle of the peripheral surface is increased as a thicknesswise position of the peripheral surface approximates to the rear face from the boundary portion. The flat surface portion is formed between a peripheral surface of the front-side nugget portion and the peripheral surface of the back-side nugget portion along the boundary portion.

By irradiating a workpiece with a laser, the front-side nugget portion and the back-side nugget portion are formed in the weld. The size of the back-side nugget portion affects the weld strength. In other words, the greater the diameter of the back-side nugget portion is, the greater the weld strength is. According to the present embodiment, the diameter of the back-side nugget portion can be approximated to the diameter of the front-side nugget portion without excessively increasing the diameter of the front-side nugget portion. Accordingly, the weld strength can be increased while keeping the diameter of the front-side nugget portion under control.

In this embodiment, each of the first plate and the second plate is formed of stainless steel, and the thickness of the first plate may be less than the thickness of the second plate. An example of the first plate is a flexure having a circuit portion of a disk drive suspension. An example of the second plate is a load beam of the disk drive suspension.

An embodiment of a welding apparatus comprises a workpiece supporting portion, a retaining jig, a laser irradiation device, and a controller. The controller controls the laser irradiation device. The retaining jig fixes a workpiece placed on the workpiece supporting portion. The laser irradiation device emits laser beams at the workpiece. By the laser irradiation device, a first-time laser beam is emitted at the work. By this laser irradiation, an initial nugget including a front-side nugget portion and a back-side nugget portion is formed. After the initial nugget has been formed, the laser irradiation device emits the laser beam again at the initial nugget. In this way, the diameter of the back-side nugget portion is increased.

An embodiment of a welding method comprises a step of disposing a first plate and a second plate to overlap one another in a thickness direction, a first-time laser irradiation step, and a second-time or subsequent laser irradiation step. In the first-time laser irradiation step, by emitting the laser beam at the first plate, an initial nugget is formed. After the initial nugget has been solidified, the second-time or subsequent laser irradiation step is performed. In the second-time or subsequent laser irradiation step, by emitting the laser beam again at the initial nugget, the diameter of the back-side nugget portion is increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A workpiece including a weld, a welding apparatus, and a welding method according to one embodiment will be hereinafter described with reference to FIGS. 1 to 7.

Figure 1:
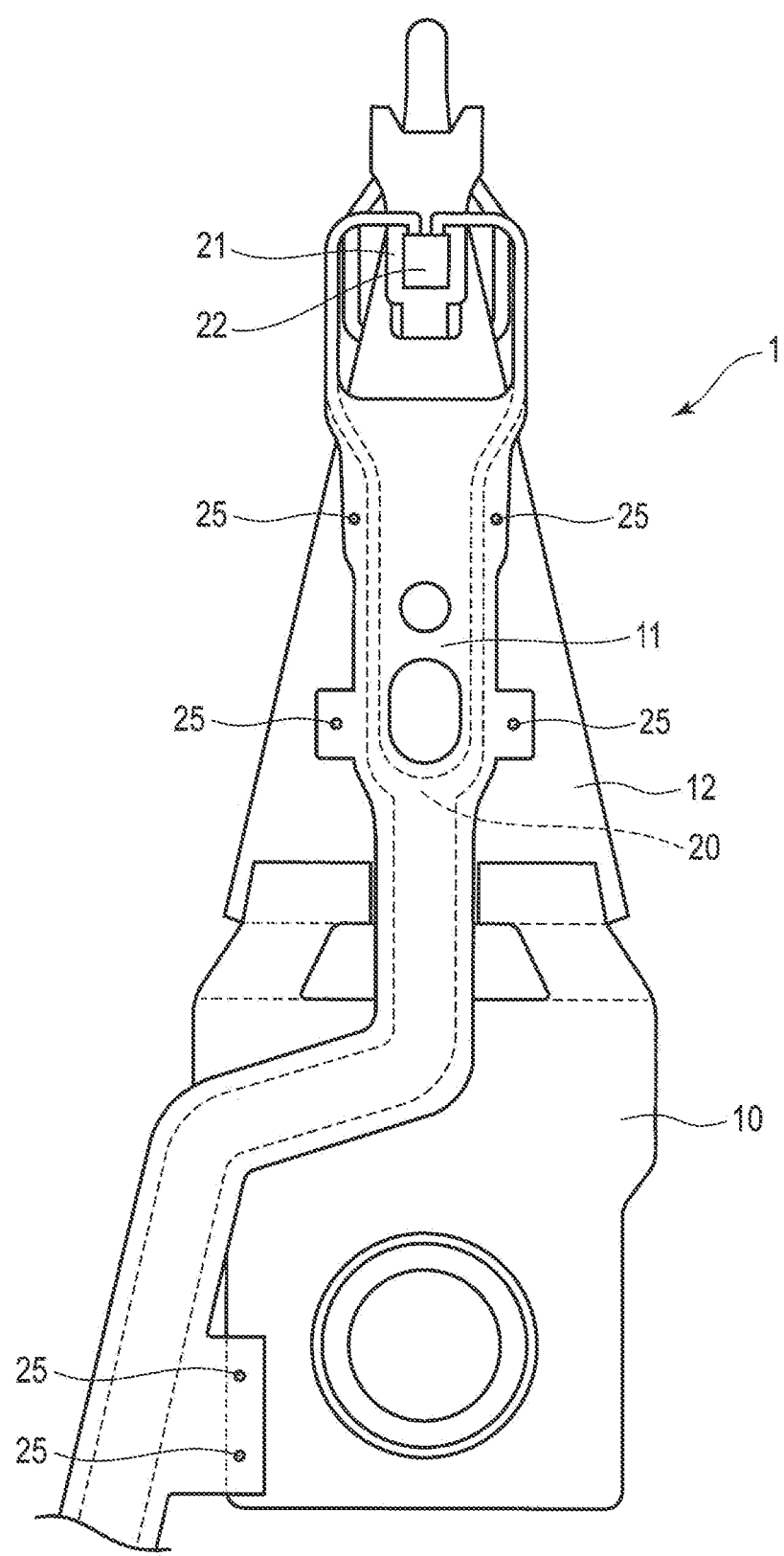
FIG. 1 is a plan view of a workpiece (disk drive suspension) including welds.

FIG. 1 shows a disk drive suspension 1 (which will be hereinafter simply referred to as a suspension 1) as an example of a workpiece. The suspension 1 comprises a baseplate 10, a first plate (flexure) 11, and a second plate (load beam) 12. The first plate 11 and the second plate 12 are each formed of stainless steel having springiness.

An example of the first plate 11 is a flexure with a circuit member. A circuit portion 20 is formed along one surface of the first plate 11. The circuit portion 20 includes an insulating layer made of insulating resin such as polyimide, and conductors made of copper. The first plate 11 is made of stainless steel having a thickness of 100 μm or less, for example. The second plate 12 is made of stainless steel having a thickness of 200 μm or less, for example.

The thickness of the first plate 11 is, for example, 18 μm. The thickness of the second plate 12 is, for example, 30 μm. The second plate 12 is thicker than the first plate 11. A tongue (gimbal portion) 21 is formed near a distal end of the first plate 11. A slider 22 which functions as a magnetic head is mounted on the tongue 21. The circuit portion 20 is electrically connected to terminals of the slider 22. The first plate 11 is fixed to the second plate 12 by welds 25 formed at multiple places.

The second plate 12 is made of the same metal as that used for the first plate 11 (for example, austenitic stainless steel such as SUS304). The chemical components (wt %) of SUS304 are C:0.08 or less, Si:1.00 or less, Mn:2.00 or less, Ni:8.00 to 10.50, Cr:18.00 to 20.00, and Fe: the remainder.

Figure 2:
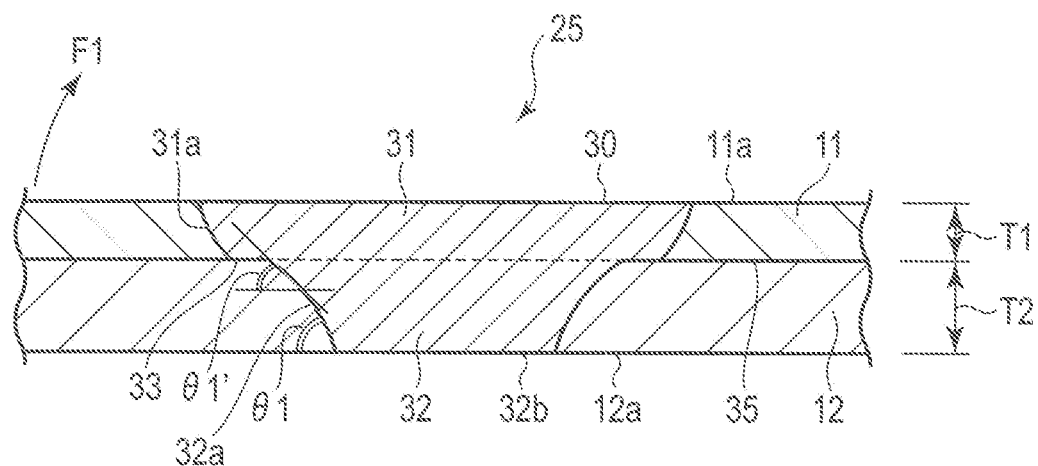
FIG. 2 is a cross-sectional view of a weld of the workpiece shown in FIG. 1 in an enlarged scale.
Figure 3:
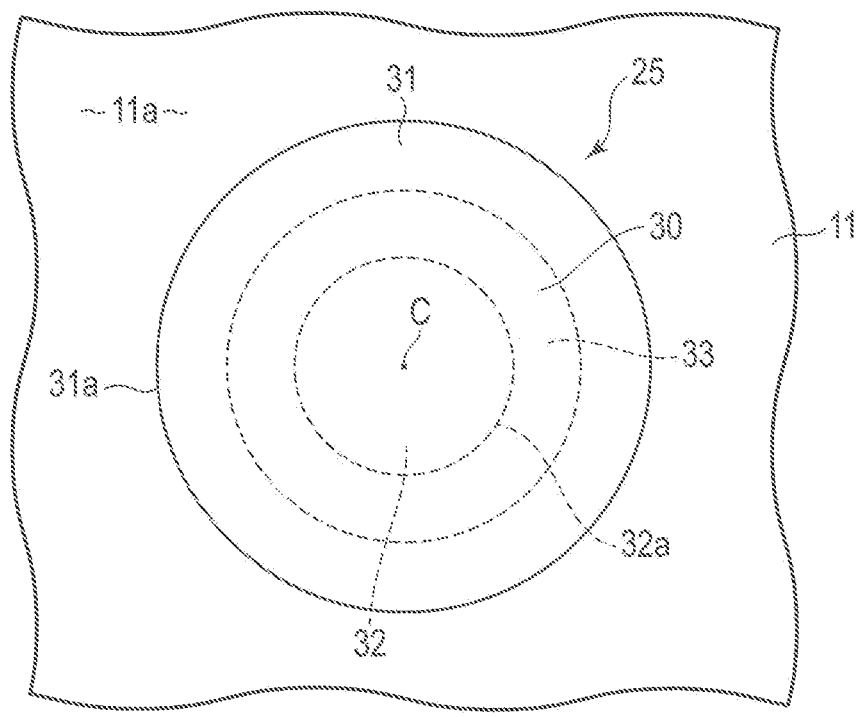
FIG. 3 is a plan view of the weld shown in FIG. 2.

FIG. 2 is a cross-sectional view of the weld 25 in an enlarged scale. A thickness T1 of the first plate 11 is less than a thickness T2 of the second plate 12. The first plate 11 and the second plate 12 overlap one another in a thickness direction. The first plate 11 and the second plate 12 are fixed to each other by a nugget 30 formed in the weld 25. FIG. 3 is a planar view (plan view) of the weld 25. The shape of the nugget 30 is not limited to a perfect circle in a planar view of the weld 25, but may actually be a shape similar to a deformed circle, an ellipse, or a shape similar to a circle other than the above.

The weld 25 as shown in FIG. 2 includes a front-side nugget portion 31, a back-side nugget portion 32, and a flat surface portion 33. The front-side nugget portion 31 is formed in the first plate 11. The back-side nugget portion 32 is formed in the second plate 12. The flat surface portion 33 is formed between the front-side nugget portion 31 and the back-side nugget portion 32. As shown in FIG. 3, the flat surface portion 33 is formed annularly about a center C of the nugget 30 in a planar view of the weld 25.

In this specification, a side irradiated with a laser beam is referred to as a front side, and a side opposite to a side subjected to the laser beam irradiation is referred to as a back side. The annular flat surface portion 33 is formed between a peripheral surface 31a of the front-side nugget portion 31 and a peripheral surface 32a of the back-side nugget portion 32. Moreover, the flat surface portion 33 is along a boundary portion 35 between a surface of the first plate 11 and a surface of the second plate 12. The boundary portion 35 is a matching portion of the first plate 11 and the second plate 12.

The front-side nugget portion 31 and the back-side nugget portion 32 are constituted of a metal structure integral with each other. The integral metal structure intended here refers to a metal structure which is solidified after being heated and melted by the laser irradiation. A nugget diameter of the back-side nugget portion 32 is smaller than a nugget diameter of the front-side nugget portion 31. The back-side nugget portion 32 is shaped such that the nugget diameter is gradually reduced from the boundary portion 35 between the first plate 11 and the second plate 12 toward a rear face 12a of the second plate 12.

FIG. 2 represents a thicknesswise cross section of the weld 25. In this cross section, the peripheral surface 32a of the back-side nugget portion 32 forms a tilt angle θ1 with respect to the rear face 12a of the second plate 12. Moreover, the peripheral surface 32a of the back-side nugget portion 32 has a curved cross-sectional shape in which the tilt angle θ1 is increased as a thicknesswise position of the peripheral surface approximates to the rear face 12a of the second plate 12 from the boundary portion 35. For instance, in FIG. 2, the tilt angle θ1 near to the rear face 12a is greater than a tilt angle θ1' near to the boundary portion 35. A distal end 32b of the back-side nugget portion 32 reaches the rear face 12a of the second plate 12. In other words, the nugget 30 of the present embodiment is formed as the so-called penetrating nugget. The distal end 32b of the back-side nugget portion 32 is exposed in a shape similar to a circle at the rear face 12a of the second plate 12. The nugget 30 having such a shape can be formed by a welding apparatus 40 and a welding method described below.

Figure 4:
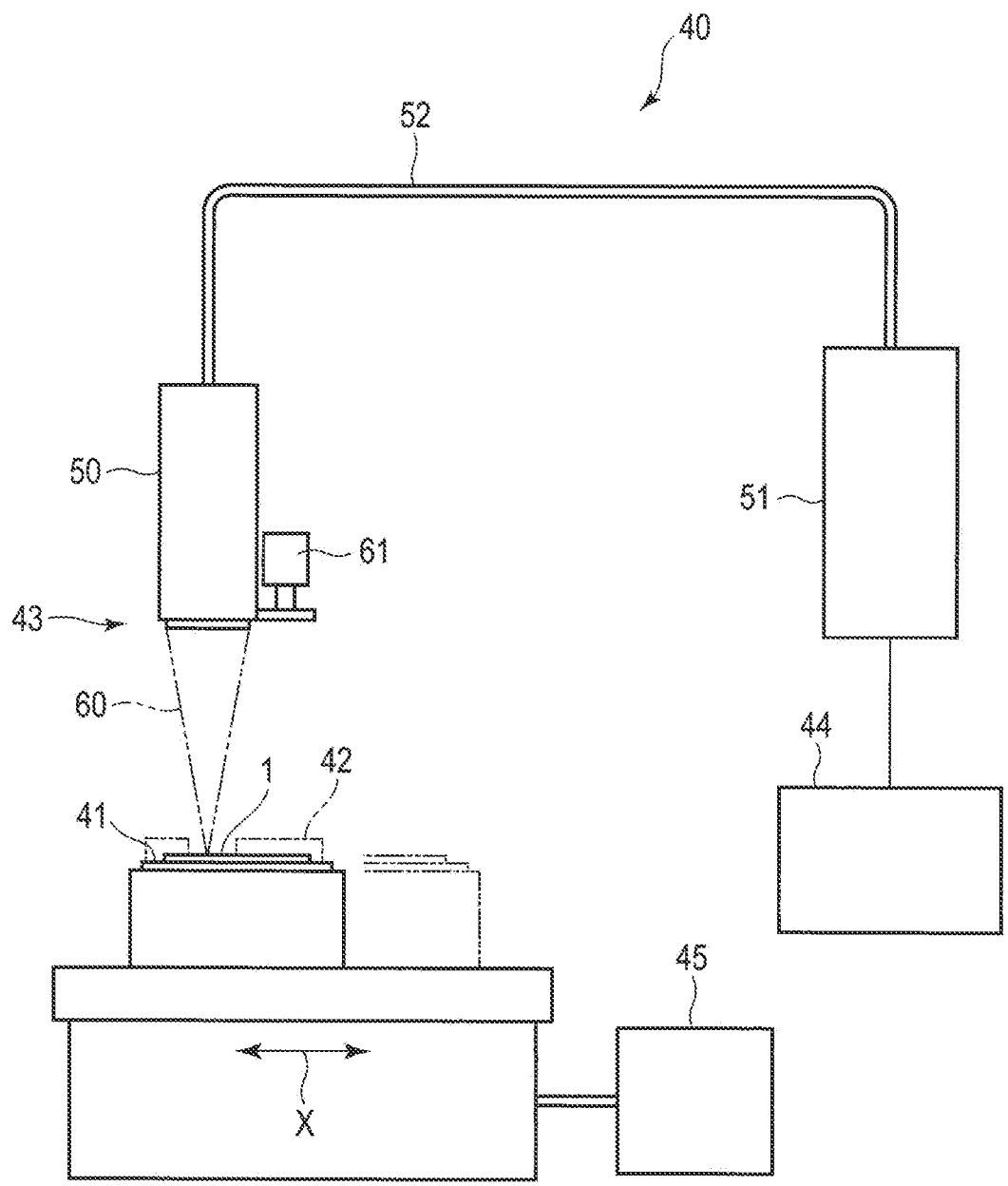
FIG. 4 is a front view showing one embodiment of a welding apparatus.
Figure 5:
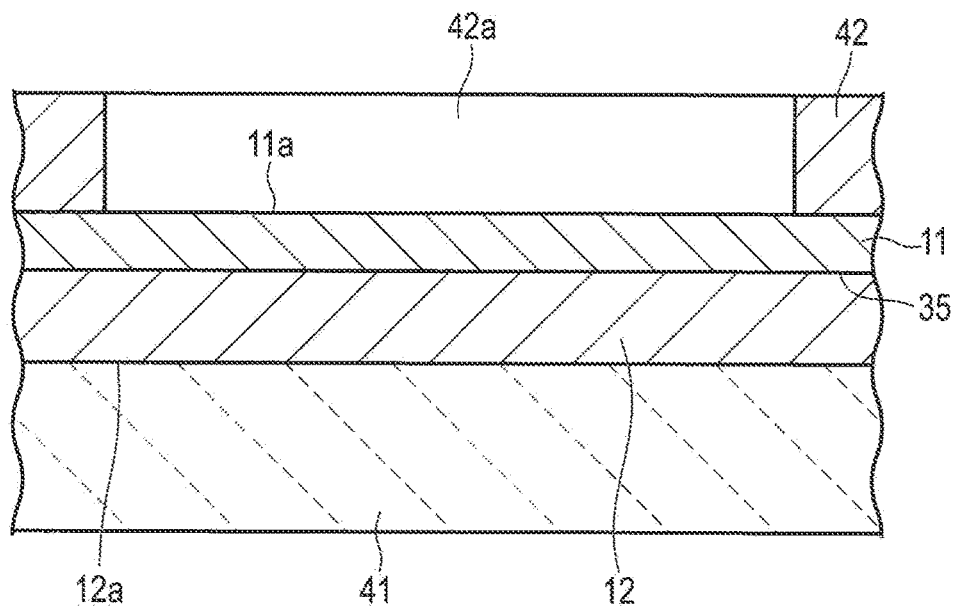
FIG. 5 is a cross-sectional view of a workpiece before a laser beam is emitted, and a part of the welding apparatus.
Figure 6:
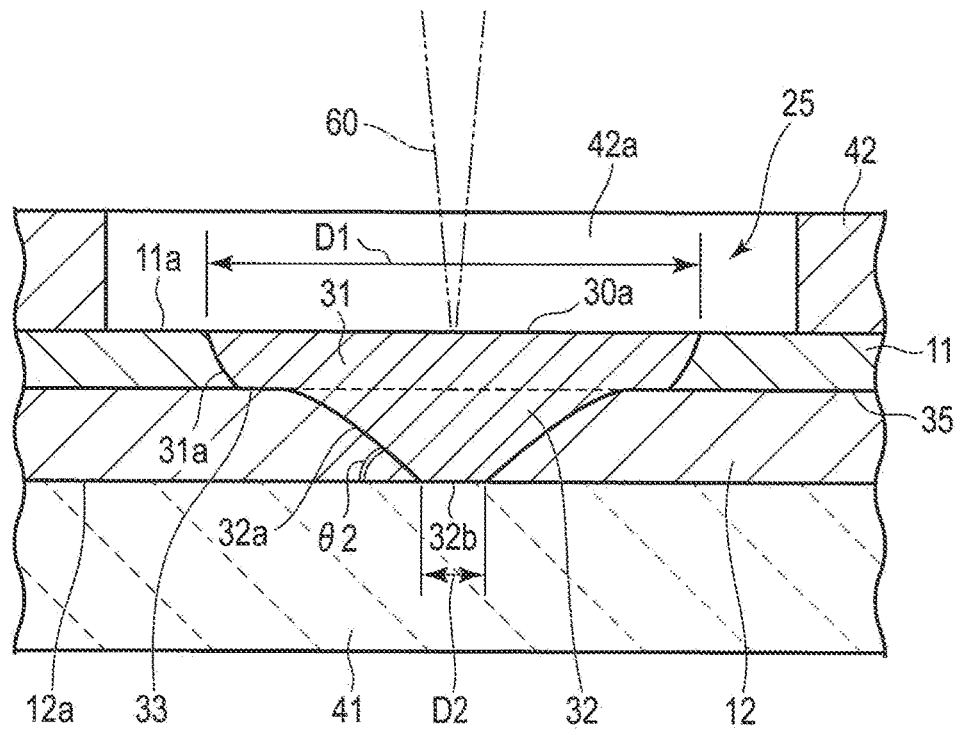
FIG. 6 is a cross-sectional view showing an initial nugget formed by first-time laser beam irradiation and a part of the welding apparatus.
Figure 7:
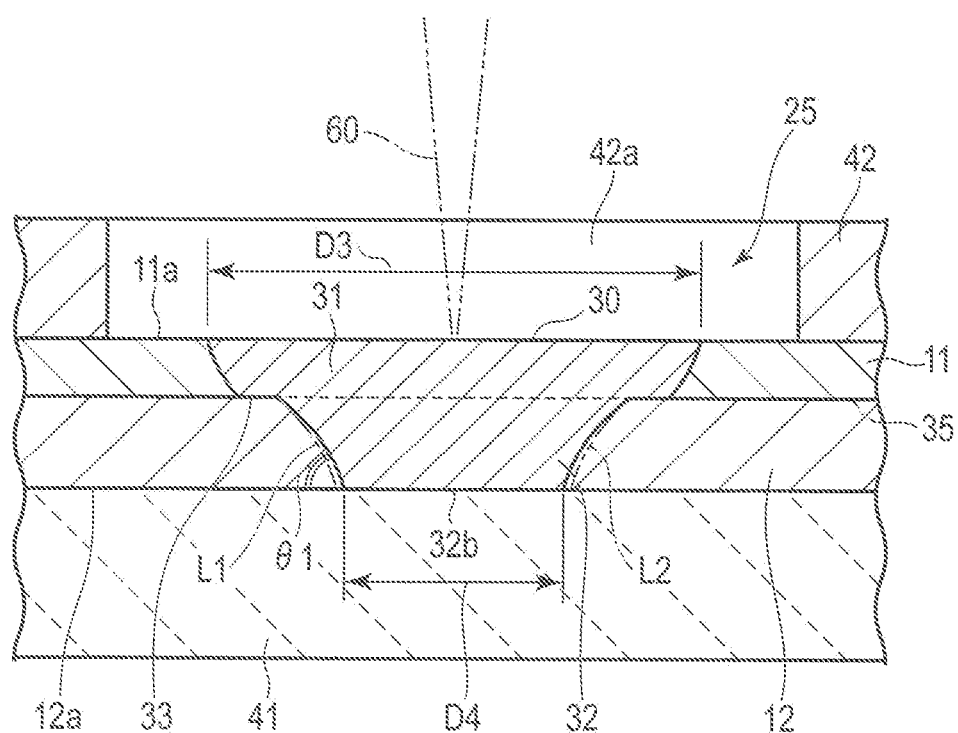
FIG. 7 is a cross-sectional view showing a nugget formed by second-time laser beam irradiation and a part of the welding apparatus.

FIG. 4 shows an example of the welding apparatus 40. The welding apparatus 40 includes a workpiece supporting portion 41, a retaining jig 42, a laser irradiation device 43, a controller 44, and a movement mechanism 45. A workpiece (suspension 1) is placed on the workpiece supporting portion 41. The retaining jig 42 fixes the suspension 1 placed on the workpiece supporting portion 41. The movement mechanism 45 relatively moves the workpiece supporting portion 41 with respect to the laser irradiation device 43. FIGS. 5 to 7 show a part of the workpiece supporting portion 41 and the retaining jig 42.

The workpiece supporting portion 41 is made of ceramic. By forming the workpiece supporting portion 41 of ceramic, molten metal of the weld 25 can be prevented from adhering to the workpiece supporting portion 41. For this reason, the workpiece supporting portion 41 can be arranged directly below the weld 25, and the workpiece (suspension 1) can be stably clamped. In the retaining jig 42, a through-hole 42a through which a laser beam 60 can pass is formed.

The workpiece supporting portion 41 and the retaining jig 42 have the function of keeping the suspension 1 at a predetermined position. Arrow X in FIG. 4 indicates a first horizontal direction. The workpiece supporting portion 41 is driven in the first horizontal direction indicated by arrow X, and a second horizontal direction orthogonal to arrow X by the movement mechanism 45. Note that the workpiece supporting portion 41 may be configured to move up and down, so that the workpiece supporting portion 41 may be moved vertically by an elevator mechanism.

The laser irradiation device 43 includes a laser head 50, a laser oscillator 51, a guide member 52, etc. The guide member 52 optically guides the laser beam output from the laser oscillator 51 to the laser head 50. In one example, the laser oscillator 51 is configured such that a wavelength of the laser beam to be output is 1.06 μm, the maximum power is 15 watts (W), and the output energy is variable.

The laser oscillator 51 is controlled by the controller 44. When the first plate 11 is thin such as when it is formed of metal foil, the laser oscillator 51 emits the laser beam 60 within a range of power and time close to the minimum power and the minimum amount of time allowing the laser beam 60 to be emitted stably. The suspension 1 is supported on the workpiece supporting portion 41. The laser irradiation device 43 comprises a focal position adjusting mechanism 61. The laser irradiation device 43 emits the converged (focused) laser beam 60 at the suspension 1.

The controller 44 has the function of controlling the laser irradiation device 43. The laser irradiation device 43 is controlled by the controller 44, and emits the laser beam 60 (FIG. 6) for the first time at the weld of the suspension 1. In this way, an initial nugget 30a is formed. The initial nugget 30a includes the front-side nugget portion 31, the back-side nugget portion 32, and the annular flat surface portion 33. The front-side nugget portion 31 is formed in the first plate 11. The back-side nugget portion 32 is formed in the second plate 12. The flat surface portion 33 is formed between the front-side nugget portion 31 and the back-side nugget portion 32. The flat surface portion 33 is along the boundary portion 35 between the first plate 11 and the second plate 12.

Next, a welding method of forming the weld 25 by using the welding apparatus 40 of the present embodiment will be explained.

As shown in FIG. 5, the first plate 11 and the second plate 12 are disposed to overlap one another in the thickness direction, and are placed on the workpiece supporting portion 41. Then, the first plate 11 and the second plate 12 are fixed (clamped) by the retaining jig 42.

(1) First-Time Laser Irradiation

As shown in FIG. 6, in a first-time laser irradiation step, the laser beam 60 is emitted at a surface 11a of the first plate 11. The laser beam 60 to be emitted is converged (focused) such that the laser beam 60 is brought into focus near the surface 11a of the first plate 11.

In the first-time laser irradiation, when the laser beam 60 is emitted on the first plate 11, a part of the first plate 11 (weld 25) is heated and melted, and the heat is transmitted from the first plate 11 to the second plate 12. Accordingly, the second plate 12 is also heated.

However, microscopically, a small gap exists at the boundary portion 35 between the first plate 11 and the second plate 12. Accordingly, discontinuous thermal resistance is generated at the boundary portion 35 between the first plate 11 and the second plate 12. Since thermal energy to be transmitted to the second plate 12 is attenuated at the boundary portion 35 by this thermal resistance, a quantity of heat that the second plate 12 receives is small. Consequently, a nugget diameter of the back-side nugget portion 32 is smaller than a nugget diameter of the front-side nugget portion 31. Moreover, the flat surface portion 33 is formed along the boundary portion 35 between the peripheral surface 31a of the front-side nugget portion 31 and the peripheral surface 32a of the back-side nugget portion 32. The laser beam 60 to be irradiated should be output with energy intensity that allows the distal end 32b of the back-side nugget portion 32 to reach the rear face 12a of the second plate 12, more specifically, a penetrating nugget to be formed.

As described above, by the irradiation of the laser beam 60 for the first time, a part of the first plate 11 and a part of the second plate 12 are melted and solidified, and the initial nugget 30a is formed. The initial nugget 30a includes the front-side nugget portion 31 formed in the first plate 11, the back-side nugget portion 32 formed in the second plate 12, and the annular flat surface portion 33. The flat surface portion 33 is formed between the front-side nugget portion 31 and the back-side nugget portion 32. The back-side nugget portion 32 formed by the first-time laser irradiation is quite small as compared to the front-side nugget portion 31. However, the distal end 32b of the back-side nugget portion 32 reaches the rear face 12a of the second plate 12.

(2) Second-Time or Subsequent Laser Irradiation

After the initial nugget 30a is formed, second-time laser irradiation is performed. As shown in FIG. 7, in a second-time laser irradiation step, the laser beam 60 is emitted at the initial nugget 30a (FIG. 6) again. The second-time or subsequent laser irradiation is performed after at least a part of the weld 25 has been solidified. The energy intensity of the laser beam 60, which is emitted in the second-time or subsequent laser irradiation step, is set to be of the same level as that of the laser beam 60 emitted in the first-time laser irradiation step, and such laser beam 60 is converged at the weld 25.

By the second-time laser irradiation, the initial nugget 30a is heated again to a melting temperature. At this time, the front-side nugget portion 31 and the back-side nugget portion 32 have already been formed in the first plate 11 and the second plate 12 by the previous (first-time) laser irradiation. Since the front-side nugget portion 31 and the back-side nugget portion 32 are solidified integrally, these nugget portions 31 and 32 serve as a "passage for heat" of low thermal resistance. Accordingly, when the second-time laser irradiation is performed, the front-side nugget portion 31 is remelted, and the heat is directly transmitted to the back-side nugget portion 32. Consequently, the back-side nugget portion 32 is remelted, and the back-side nugget portion 32 in a molten state is expanded. The back-side nugget portion 32 whose diameter has been increased by the melting is solidified after the laser irradiation has been finished. For this reason, the diameter of the back-side nugget portion 32 (FIG. 7) for which the second-time laser irradiation has been performed becomes greater than the diameter of the back-side nugget portion 32 (FIG. 6) of the initial nugget 30a. Note that a laser irradiation step similar to the second irradiation step may be repeated three times or more.

The suspension 1 shown in FIG. 1 includes a plurality of welds 25. In the case of the suspension 1 as described above, after performing the first-time laser irradiation in each of the welds 25 in a predetermined order, the second-time or subsequent laser irradiation may be performed in each of the welds 25 in the same order as the first-time laser irradiation.

FIGS. 2 and 7 show the nugget 30 including the back-side nugget portion 32 with the increased diameter as a result of the second-time laser irradiation. The tilt angle θ1 of the peripheral surface 32a of the back-side nugget portion 32 is increased as a thicknesswise position of the peripheral surface 32a approximates to the rear face 12a of the second plate 12 from the boundary portion 35. Moreover, the tilt angle θ1 is considerably larger than a tilt angle θ2 (FIG. 6) of the back-side nugget portion 32 of the initial nugget 30a formed by the first-time laser irradiation. Thus, a diameter D4 of the back-side nugget portion 32 for which the second-time laser irradiation has been performed can be made to approximate a diameter D3 of the front-side nugget portion 31.

FIG. 6 shows a cross-section of the initial nugget 30a obtained by the first-time laser irradiation, and the diameter of the front-side nugget portion 31 exposed on the surface 11a is represented as D1. Further, the diameter of the back-side nugget portion 32 exposed on the rear face 12a is represented as D2. According to an experiment carried out by the inventors of the present invention, in the case of the initial nuggets 30a formed at a plurality of places, the mean value of the diameters D1 of the front-side nugget portions 31 was 0.156 mm. In contrast, the mean value of the diameters D2 of the back-side nugget portions 32 was 0.054 mm, which is considerably smaller than the mean diameter of the front-side nugget portions 31, and variations in the diameters were also large.

FIG. 7 shows a cross-section of the nugget 30 after the second-time laser irradiation has been performed, and the diameter of the front-side nugget portion 31 exposed on the surface 11a is represented as D3. Further, the diameter of the back-side nugget portion 32 exposed on the rear face 12a is represented as D4. According to an experiment carried out by the inventors of the present invention, in the nuggets 30 obtained after the second-time laser irradiation has been performed, the mean value of the diameters D3 of the front-side nugget portions 31 was 0.157 mm. As compared to the diameter D1 of the front-side nugget portion 31 of the initial nugget 30a, the diameter D3 increased only a little. In contrast, the mean value of the diameters D4 of the back-side nugget portions 32 was 0.073 mm, and the diameter D4 greatly increased as compared to the diameter D2 of the back-side nugget portion 32 of the initial nugget 30a. In other words, by the second-time laser irradiation, the diameter D4 of the back-side nugget portion 32 could be substantially increased. Moreover, by performing the laser irradiation twice or more, variations in the diameters D4 of the back-side nugget portions 32 can be reduced.

In the experiment carried out by the present inventors, laser irradiation has been performed seven times in total at the same weld. Further, for each execution of the laser irradiation, the diameter D3 of the front-side nugget portion 31 and the diameter D4 of the back-side nugget portion 32 were measured. As a result, it was found that the nugget diameter of the front-side nugget portion 31 hardly increases even if the laser irradiation is performed several times. In contrast, in the back-side nugget portion 32, if the laser beam is emitted three times or more, it has been found that the nugget diameter was slightly increased in some cases as shown by two-dot chain lines L1 and L2 shown in FIG. 7. However, even if the laser irradiation is executed more frequently than the above, the diameter D4 of the back-side nugget portion 32 does not substantially change. In other words, sufficient advantage can be obtained by two to three times of laser irradiation. Note that the laser irradiation may be executed three times or more, if necessary. Further, energy intensity of the laser beam to be emitted for the first time and energy intensity of the laser beam to be emitted for the second time onward may be different from each other.

A part near the weld may be deformed by the influence of heat in the welding. By such deformation or external force, etc., force F1 (FIG. 2) in a direction of separating the first plate 11 from the second plate 12 may be applied to the weld 25. In the weld 25 of the present embodiment, the flat surface portion 33 along the boundary portion 35 is formed between the peripheral surface 31a of the front-side nugget portion 31 and the peripheral surface 32a of the back-side nugget portion 32. In other words, the peripheral surfaces 31a and 32a of the nugget 30 constitute a discontinuous cross section in the thickness direction of the weld 25. By this structure, stress produced when the force F1 in the direction of separating the first plate 11 at the weld 25 is dispersed in the peripheral surfaces 31a and 32a and the flat surface portion 33. Consequently, stress concentration on the peripheral surfaces 31a and 32a is moderated, and the possibility of the periphery of the nugget 30 being a weak point in strength can be reduced.

As explained above, the present embodiment relates to laser welding performed in a state in which the first plate 11 and the second plate 12 overlap one another. In the laser welding, by emitting a low-power laser beam 60 at the same weld 25 several times, it has become possible to increase the diameter of the back-side nugget portion 32 which affects the weld strength while preventing the diameter of the front-side nugget portion 31 from increasing. In other words, the diameter of the front-side nugget portion 31 can be made as small as possible, and the diameter of the back-side nugget portion 32 which affects the weld strength can be made to approximate the diameter of the front-side nugget portion 31.

According to the weld 25 of the present embodiment, the diameter of the front-side nugget portion 31 can be reduced while ensuring the weld strength. Accordingly, assuming that a distance from the center of the nugget 30 to the circuit portion 20 (FIG. 1) is constant, as compared to a conventional product in which the diameter of the front-side nugget portion is large, a distance from an outer circumference of the nugget 30 to the circuit portion 20 can be increased. Accordingly, it is possible to prevent insulating resin (for example, polyimide) of the circuit portion 20 from being burnt or deteriorated by the heat of the nugget 30 at the time of welding. Accordingly, there is an advantage that a distance between the circuit portion 20 and the weld 25 can be reduced, and the flexibility of the design of a workpiece such as the suspension 1 is increased.

Further, with the welding method of the present embodiment, the diameter of the back-side nugget portion 32 can be increased without increasing the laser output by emitting a low-power laser beam 60 at the same weld 25 several times. Moreover, since the laser beam 60 is output at low power, it is possible to prevent holes from being formed in the nugget, and also to increase the diameter of the back-side nugget portion 32. In other words, the diameter of the back-side nugget portion 32 can be increased without increasing the diameter of the front-side nugget portion 31, and variations in the diameters of the back-side nugget portions 32 formed at a plurality of places can also be reduced. Also, since a low-power laser beam is used, it is also possible to prevent the first plate 11 and the second plate 12 from being warped by the heat in welding, and suppress generation of spatters. In other words, with the weld of the present embodiment, it is possible to obtain weld strength greater than or equal to that of the conventional laser welding in which a laser beam with great energy intensity is emitted, and a heat-affected zone can be minimized.

Needless to say, in carrying out the present invention, as well as the shape and thickness of the first plate and the second plate which constitute the workpiece, the shape, arrangement, etc., of the nugget may be modified variously without departing from the spirit of the invention. Also, the present invention can be applied to welding of workpiece other than the disk drive suspension.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A workpiece welding method of welding a workpiece including a first plate and a second plate thicker than the first plate by a laser beam, the first plate and the second plate being made of stainless steel, and the workpiece welding method comprising:
   disposing the first plate and the second plate to overlap one another in a thickness direction;
   a first-time laser irradiation step including emitting the laser beam at the first plate, thereby forming an initial nugget penetrated through the first and second plates, the initial nugget including (i) front-side nugget portion formed in the first plate, (ii) a back-side nugget portion formed in the second plate, the back-side nugget portion being integral with the front-side nugget portion and having a diameter smaller than a diameter of the front-side nugget portion, and (iii) an annular flat surface portion formed between a peripheral surface of the front-side nugget portion and a peripheral surface of the back-side nugget portion; and
   a second-time or subsequent laser irradiation step including emitting the laser beam again at the initial nugget after the initial nugget is solidified, thereby increasing the diameter of the back-side nugget portion and shaping the back-side nugget portion such that the diameter thereof is gradually reduced from a boundary portion between the first plate and the second plate toward a rear face of the second plate and such that, in a thicknesswise cross section of the second plate, a tilt angle of the peripheral surface of the back-side nugget portion with respect to the rear face increases as a thicknesswise portion of the peripheral surface of the back-nugget portion approaches the rear face from the boundary portion,
   wherein the annular flat surface is continuous in a circumferential direction around the back-side nugget portion and extends along the boundary portion.

2. The workpiece welding method of claim 1, wherein the laser beam emitted in the first-time laser irradiation step, and the laser beam emitted in the second-time or subsequent laser irradiation step are both converged to a weld, and in the first-time laser irradiation step and the second-time or subsequent laser irradiation step, an energy intensity of the laser beam to be emitted is the same.

3. The workpiece welding method of claim 1, wherein the laser beam has an energy intensity allowing a distal end of the back-side nugget portion of the initial nugget to reach the rear face of the second plate.

4. The workpiece welding method of claim 2, wherein the energy intensity of the laser beam allows a distal end of the back-side nugget portion of the initial nugget to reach the rear face of the second plate.

* * * * *